United States Patent Office 2,875,260
Patented Feb. 24, 1959

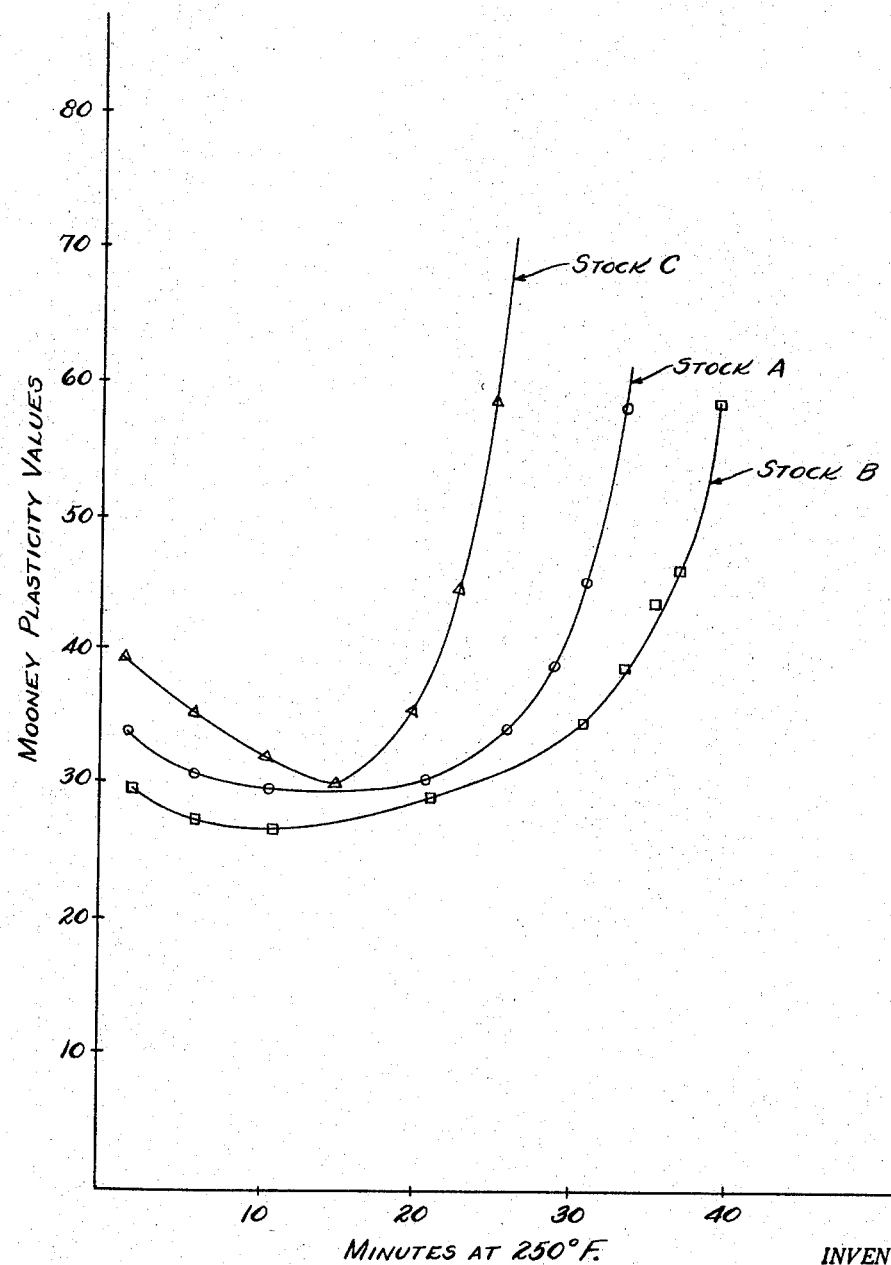

2,875,260

METHOD OF VULCANIZING RUBBER WITH AN N,N - DIALKENYLTHIOCARBAMYL SULFENAMIDE AS AN ACCELERATOR, AND THE VULCANIZABLE COMPOSITION

Glen Alliger, Akron, Ohio, and Henry P. Stevens, Midland, Mich., assignors to The Firestone Tire & Rubber Company, Akron, Ohio, a corporation of Ohio Application July 23, 1956, Serial No. 599,490

16 Claims. (Cl. 260—793)

This invention relates to a novel class of sulfenamides and their application as rubber vulcanization accelerators in super-fine furnace black stocks.

During recent years the channel carbon blacks have been increasingly replaced by the newer fine furnace blacks in pneumatic tire tread compositions. The new furnace blacks, designated HAF, ISAF and SAF blacks, have become so popular because they impart much longer tread life to tires than did the channel blacks. Whereas the channel blacks were acidic in reaction, the new furnace blacks are alkaline, displaying pH values above 7.0. Perhaps partly because of their alkalinity the new furnace blacks have been difficult to handle in modern high speed rubber processing equipment, because they tend to make rubber stocks "scorchy," the stocks tending to set up or pre-cure before the end of the mechanical working of the stocks during processing in banbury mixers, mills, calendars and extruders. A scorched stock, of course, must be scrapped.

It is an object of the present invention to provide a new class of thiocarbamyl sulfenamides possessing unique rubber vulcanization accelerating characteristics. It is also an object to provide improved rubber compositions free from tendency to scorch during factory processing operations. A further object is to provide an improved method of manufacturing furnace black reinforced rubber compositions. The above and further objects will become apparent in the description of the invention which follows, and in the accompanying drawing, which charts a comparison of the scorching properties of compositions of the invention with a prior art composition.

The objects of the invention are realized through the discovery of a new class of sulfenamides, the N,N-dialkenylthiocarbamyl sulfenamides of the following formula:

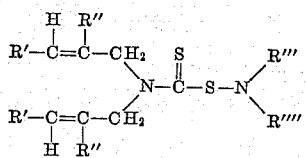

wherein R' and R" are hydrogen or alkyl radicals, R''' is hydrogen or an alkyl or cycloalkyl radical and R'''' is an alkyl or cycloalkyl radical, with the proviso that R''' and R'''' can be joined to form a cyclic divalent radical which together with the adjacent nitrogen atom constitute a heterocyclic radical, such, for example, as the piperidino- or the morpholino-radicals. The invention is illustrated by the following examples.

EXAMPLE 1

*N-n-butyl-N',N'-diallylthiocarbamyl sulfenamide*

One mole of a solution of sodium diallyldithiocarbamate was prepared by gradually adding 1 mole of carbon disulfide to an aqueous solution of 1 mole of sodium hydroxide mixed with 1 mole of diallylamine. N-monochloro-n-butylamine was prepared by adding 1.2 moles (480 ml.) of aqueous sodium hypochlorite gradually to 2.0 moles of n-butylamine, at 0° to 5° C. Then the dithiocarbamate solution was slowly added with stirring to the chloramine solution maintained at 0° to 5° C. The oily layer which separated was removed from the aqueous layer in a separatory funnel, and then it was washed five times with three times its volume of water. Thereafter the oil was dried, first over anhydrous sodium sulfate and then over anhydrous calcium sulfate. Thus the desired sulfenamide was obtained in a yield of 135 grams or 55% of theory. The sulfenamide possessed the refractive index, $N_D^{25}$ 1.5497. Analysis: Nitrogen 11.0% (calculated 11.5%); sulfur 25.5% (calculated 26.3%).

EXAMPLE 2

In a similar manner a monochloramine solution was prepared from piperazine and sodium hypochlorite solution. The monochloramine solution was reacted with a solution of sodium diallyldithiocarbamate according to the procedure of Example 1. The resulting N,N-cyclodiethylene-imino-N',N'-diallylthiocarbamyl sulfenamide was a stable oil.

EXAMPLE 3

*N-n-butyl-N',N'-dimethallylthiocarbamyl sulfenamide*

One mole (500 ml. of a 2 molar solution) of sodium dimethallyldithiocarbamate was prepared in the usual manner from dimethallylamine, sodium hydroxide solution and carbon disulfide. Sodium hypochlorite (1.2 moles in 480 ml. aqueous solution) was gradually added at −5° to 0° C. to 2 moles of n-butylamine to produce the monochloramine. Then the dithiocarbamate solution was added at −5° to 0° C. to the chloramine solution. The light yellow oil which separated was washed several times with water and then dried. The yield of the desired sulfenamide was 210 grams (69% of theory). The sulfenamide possessed the refractive index, $N_D^{25}$ 1.5382. Analysis: Nitrogen 10.0% (calculated 10.3%); sulfur 23.0% (calculated 23.5%).

EXAMPLE 4

*N-sec-amyl-N'-N'-dimethallylthiocarbamyl sulfenamide*

In a manner similar to the procedure of Example 3 a monochloramine solution was prepared from mono-sec-amylamine and sodium hypochlorite solution. The monochloramine solution was reacted with a solution of sodium dimethallyldithiocarbamate according to the procedure of Example 3. The resulting sulfenamide was obtained in a yield of 61% as a stable oil.

The sulfenamides of Examples 1 and 3 were compared as vulcanization accelerators with N-cyclohexyl-N',N'-diethylthiocarbamyl sulfenamide (U. S. Patent 2,381,392), a powerful delayed-action accelerator of proved efficacy in channel black stocks. The comparisons were made in a tire tread stock reinforced by a commercial super-fine furnace black, the formulas being set out in Table 1, all parts being by weight.

TABLE 1

| Ingredients | A | B | C |
|---|---|---|---|
| Rubber (smoked sheets) | 100 | 100 | 100 |
| HAF carbon black | 60 | 60 | 60 |
| Sulfur | 2.2 | 2.2 | 2.2 |
| Stearic acid | 3 | 3 | 3 |
| Zinc oxide | 2 | 2 | 2 |
| Softener | 3 | 3 | 3 |
| Antioxidant | 2 | 2 | 2 |
| Product of Example 1 | 0.8 | | |
| Product of Example 3 | | 0.8 | |
| Product of Patent 2,381,392 | | | 0.6 |

The three stocks of Table 1 were thoroughly mixed in the usual manner in a rubber mill. Samples of the three stocks were compared in the Mooney scorch test. The results are plotted in the single figure of the accompanying drawing, which clearly shows that the accelerators of Examples 1 and 3 required heating periods of 30 to 40 minutes before causing the rubber stocks to scorch, whereas the prior art accelerator produced scorching after about 20 minutes of heating.

Other portions of stocks A, B and C were vulcanized at 280° F. and the following normal and aged tensile data were obtained:

TABLE 2

|  | A | B | C |
| --- | --- | --- | --- |
| Normal Tensiles (p. s. i.): Cures in minutes— |  |  |  |
| 30 | 3,525 | 3,250 | 3,775 |
| 60 | 3,500 | 3,400 | 3,600 |
| 90 | 3,525 | 3,375 | 3,500 |
| Tensiles After Aging 2 Days at 212° F.: Cures in minutes— |  |  |  |
| 30 | 1,875 | 1,475 | 2,000 |
| 60 | 1,950 | 1,925 | 1,975 |
| 90 | 1,750 | 1,950 | 1,925 |
| Average retained tensiles_____percent__ | 53 | 52 | 54 |

Table 2 shows that the accelerators of the present invention impart good tensile properties to the furnace black stocks both before and after aging, even though they are substantially less scorchy than the excellent prior art accelerator of Patent 2,381,392.

The accelerator of Example 2 was compared as to scorchiness with the prior art accelerator of stock C by substituting it for the product of Example 1 in stock A and heating at 250° F. until the stocks became scorched. Stock C became scorched in 20 minutes, whereas stock D containing the accelerator of Example 2 required more than 60 minutes heating at 250° F. to become scorched.

The product of Example 4 was also tested as an accelerator by substituting it in stock A for the product of Example 1 and comparing it with stock C. Stock C became scorched after heating 20 minutes at 250° F., whereas stock E containing the product of Example 4 required 31 minutes at the same temperature before becoming scorched. Normal tensile properties of the two stocks are given in Table 3.

TABLE 3

| Cures in Minutes at 280° F. | C | E |
| --- | --- | --- |
| 30 | 3,650 | 3,675 |
| 60 | 3,550 | 3,650 |
| 90 | 3,500 | 3,650 |

Thus the product of Example 4 is substantially more delayed in action in a furnace black stock than is the excellent prior art accelerator, and it imparts high tensile properties to the vulcanizate.

The accelerators of the invention are effective in SAF and ISAF stocks as well as in HAF stocks. They are effective in other sulfur-vulcanizable rubbers besides natural rubber, for example in rubbery copolymers of butadiene and isoprene, of butadiene and styrene (e. g., GR–S), of butadiene and acrylonitrile (e. g., GR–A), of isobutylene and isoprene or butadiene (e. g., GR–I), in rubbery polybutadiene and in synthetic natural rubbers (polyisoprenes).

The accelerators of the invention are effective in combination with either free sulfur or with a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides, heterocyclic amine polysulfides and reaction products of primary amines with excess sulfur. Only a relatively small proportion of the accelerators of the invention are required, on the order of 0.1% to 10% of the weight of the rubber employed.

Although the fine furnace blacks (of the high abrasion type) are generally employed in a loading of 40 to 70 parts per hundred of rubber (p. h. r.), they have value as a reinforcing agent in the range of 5 to 100 p. h. r. Ordinary vulcanizing temperatures are contemplated by the invention, preferably in the range of 260° to 400° F.

What is claimed is:

1. A sulfur-vulcanizable rubber composition containing a sulfur-bearing vulcanizing agent, high abrasion, furnace carbon block and from about 0.1% to about 10% of the weight of the rubber of a delayed-action vulcanization accelerator of the following formula:

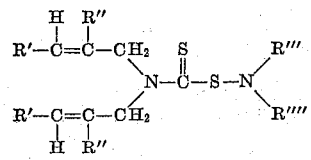

wherein R' and R'' are of the group consisting of hydrogen and alkyl radicals, R''' is from the group consisting of hydrogen, alkyl and cycloalkyl radicals, R'''' is from the group consisting of alkyl and cycloalkyl radicals, and with the proviso that R''' and R'''' can be joined to form a cyclic divalent radical which together with the adjacent nitrogen atom constitute a heterocyclic radical.

2. A sulfur-vulcanizable rubber composition containing a sulfur-bearing vulcanizing agent, super-fine furnace carbon black and as a delayed-action vulcanization accelerator from about 0.1% to about 10% of the weight of the rubber of an N,N-dialkenylthiocarbamyl sulfenamide.

3. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of an N,N-diallylthiocarbamyl sulfenamide.

4. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of an N,N-dimethallylthiocarbamyl sulfenamide.

5. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of N-n-butyl-N',N'-diallylthiocarbamyl sulfenamide.

6. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of N-n-butyl-N',N'-dimethyallylthiocarbamyl sulfenamide.

7. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of N-sec-amyl-N',N'-dimethallylthiocarbamyl sulfenamide.

8. A sulfur-vulcanizable rubber composition characterized by improved resistance to scorching during factory processing operations, comprising a sulfur-bearing vulcanizing agent, a reinforcing amount of a high abrasion furnace carbon black and as a delayed-action vulcanization accelerator from about 0.1% to about 10% of the weight of the rubber of N,N-cyclo-diethyleneimino-N',N'-diallylthiocarbamyl sulfenamide.

9. Method of vulcanizing rubber comprising heating a sulfur-vulcanizable rubber composition containing high abrasion furnace carbon black and a sulfur-bearing vulcanizing agent in the presence of from about 0.1% to about 10% of the weight of the rubber of a delayed-action vulcanization accelerator of the following formula:

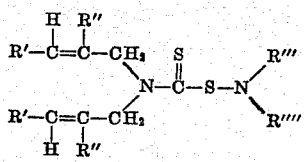

wherein R' and R" are of the group consisting of hydrogen and alkyl radicals, R'" is from the group consisting of hydrogen, alkyl and cycloalkyl radicals, R"" is from the group consisting of alkyl and cycloalkyl radicals, and with the proviso that R'" and R"" can be joined to form a cyclic divalent radical which together with the adjacent nitrogen atom constitute a heterocyclic radical.

10. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of an N,N-dialkenylthiocarbamyl sulfenamide.

11. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of an N,N-diallylthiocarbamyl sulfenamide.

12. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of an N,N-dimethallylthiocarbamyl sulfenamide.

13. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of N-n-butyl-N',N'-diallylthiocarbamyl sulfenamide.

14. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of N-n-butyl-N',N'-dimethallylthiocarbamyl sulfenamide.

15. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of N-sec-amyl-N',N'-dimethallylthiocarbamyl sulfenamide.

16. Method of vulcanizing rubber comprising heating a sulfur-vulcanizable rubber composition containing super-fine furnace carbon black, a sulfur-bearing vulcanizing agent and as a delayed-action vulcanization accelerator from about 0.1% to about 10% of the weight of the rubber of N,N-cyclo-diethylene-imino-N',N'-diallylthiocarbamyl sulfenamide.

References Cited in the file of this patent
UNITED STATES PATENTS

| | | |
|---|---|---|
| 2,381,392 | Smith et al. | Aug. 7, 1945 |
| 2,441,032 | Paul | May 4, 1948 |

UNITED STATES PATENT OFFICE
CERTIFICATION OF CORRECTION

Patent No. 2,875,260            February 24, 1959

Glen Alliger et al.

It is hereby certified that error appears in the above numbered patent requiring correction and that the said Letters Patent should read as corrected below.

Column 4, line 12, for "block" read -- black --.

Signed and sealed this 8th day of August 1961.

(SEAL)
Attest:

ERNEST W. SWIDER
Attesting Officer

DAVID L. LADD
Commissioner of Patents